US008078290B2

(12) United States Patent
Nelson

(10) Patent No.: US 8,078,290 B2
(45) Date of Patent: Dec. 13, 2011

(54) SYSTEM AND METHODS FOR CONTROLLING EMBEDDED DEVICES USING DEVICE STYLE SHEETS

(75) Inventor: Mark Nelson, Lindon, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 107 days.

(21) Appl. No.: 11/301,651

(22) Filed: Dec. 13, 2005

(65) Prior Publication Data

US 2007/0135940 A1 Jun. 14, 2007

(51) Int. Cl.

| | |
|---|---|
| ***G05B 11/01*** | (2006.01) |
| ***G05B 13/02*** | (2006.01) |
| ***G06F 3/00*** | (2006.01) |
| ***G06F 7/00*** | (2006.01) |
| ***G06F 17/00*** | (2006.01) |

(52) U.S. Cl. .............. 700/17; 700/11; 700/32; 700/221; 700/234; 715/235; 715/238; 715/740; 725/37

(58) Field of Classification Search .................... 700/11, 700/32, 221, 224, 235–236, 17, 180; 709/223; 715/235–236, 740; 725/37

See application file for complete search history.

(56) References Cited

U.S. PATENT DOCUMENTS

| | | | | |
|---|---|---|---|---|
| 5,086,385 | A * | 2/1992 | Launey et al. | 700/83 |
| 6,023,714 | A | 2/2000 | Hill et al. | |
| 6,198,479 | B1 * | 3/2001 | Humpleman et al. | 715/733 |
| 6,463,440 | B1 | 10/2002 | Hind et al. | |
| 6,756,998 | B1 * | 6/2004 | Bilger | 715/764 |
| 6,844,807 | B2 * | 1/2005 | Inoue et al. | 340/3.7 |
| 6,882,299 | B1 * | 4/2005 | Allport | 341/176 |
| 6,909,921 | B1 * | 6/2005 | Bilger | 700/19 |
| 6,919,792 | B1 | 7/2005 | Battini et al. | |
| 6,970,751 | B2 | 11/2005 | Gonzales et al. | |
| 6,980,080 | B2 | 12/2005 | Christensen et al. | |
| 6,993,711 | B1 | 1/2006 | Tanaka et al. | |
| 7,047,092 | B2 * | 5/2006 | Wimsatt | 700/83 |
| 7,130,895 | B2 * | 10/2006 | Zintel et al. | 709/220 |
| 7,155,305 | B2 * | 12/2006 | Hayes et al. | 700/224 |
| 7,200,683 | B1 * | 4/2007 | Wang et al. | 709/250 |
| 7,908,551 | B2 * | 3/2011 | Yao et al. | 715/236 |
| 2001/0034754 | A1 * | 10/2001 | Elwahab et al. | 709/201 |
| 2002/0073254 | A1 * | 6/2002 | Bertsch | 710/100 |

(Continued)

OTHER PUBLICATIONS

Webopedia, API—http://www.webopedia.com/TERM/A/API.html.*

(Continued)

*Primary Examiner* — Albert Decady
*Assistant Examiner* — Darrin Dunn
(74) *Attorney, Agent, or Firm* — Austin Rapp & Hardman

(57) ABSTRACT

Systems and methods for controlling ambiance devices, or an embedded device, using a device style sheet are disclosed. Ambiance devices include devices used to control an environment in a room or area, such as a lighting device or a heating/cooling system. A device style sheet declaration is received, in one embodiment, at an ambiance device controller. The declaration comprises a scope selector that identifies a scope of a style to be applied, a property identifier that identifies a style property to be altered, and a property value that identifies a style property value to be applied. At least one ambiance device, within the scope identified by the scope selector, that is in electronic communication with the ambiance device controller is identified. A control signal for the ambiance device is formulated based on the property identifier and property value. The control signal is then transmitted to the ambiance device.

17 Claims, 12 Drawing Sheets

U.S. PATENT DOCUMENTS

| | | | | |
|---|---|---|---|---|
| 2002/0078211 | A1* | 6/2002 | Natarajan et al. | 709/228 |
| 2002/0095651 | A1* | 7/2002 | Kumar et al. | 717/104 |
| 2003/0109270 | A1* | 6/2003 | Shorty | 455/517 |
| 2003/0227439 | A1* | 12/2003 | Lee et al. | 345/156 |
| 2004/0010561 | A1* | 1/2004 | Kim et al. | 709/208 |
| 2004/0205588 | A1* | 10/2004 | Purvis et al. | 715/513 |
| 2004/0215694 | A1 | 10/2004 | Podolsky | |
| 2004/0242240 | A1* | 12/2004 | Lin | 455/456.3 |
| 2004/0260800 | A1* | 12/2004 | Gu et al. | 709/223 |
| 2005/0041161 | A1* | 2/2005 | Dowling et al. | 348/739 |
| 2005/0066270 | A1* | 3/2005 | Ali et al. | 715/513 |
| 2005/0096753 | A1 | 5/2005 | Arling et al. | |
| 2005/0097503 | A1* | 5/2005 | Zintel et al. | 717/100 |
| 2005/0159823 | A1* | 7/2005 | Hayes et al. | 700/19 |
| 2005/0240665 | A1* | 10/2005 | Gu et al. | 709/220 |
| 2006/0085835 | A1* | 4/2006 | Istvan et al. | 725/119 |
| 2006/0200253 | A1* | 9/2006 | Hoffberg et al. | 700/19 |
| 2006/0248557 | A1* | 11/2006 | Stark et al. | 725/37 |
| 2006/0253874 | A1* | 11/2006 | Stark et al. | 725/62 |
| 2006/0259184 | A1* | 11/2006 | Hayes et al. | 700/221 |
| 2006/0291434 | A1* | 12/2006 | Gu et al. | 370/338 |
| 2007/0053513 | A1* | 3/2007 | Hoffberg | 380/201 |
| 2009/0326684 | A1* | 12/2009 | Wang et al. | 700/83 |
| 2010/0332994 | A1* | 12/2010 | Istvan et al. | 715/740 |

OTHER PUBLICATIONS

HomeSeer v2.0 New Feature List, www.homeseer.com, Aug. 26, 2005.*

Koskela et al., Evolution towards smart home environments: empirical evaluation of three user interfaces, Pers Ubiquit Comput (2004).*

Pilich, Engineering Smart Houses, Department of Informatics and Mathematical Modelling, Dec. 7, 2004.*

* cited by examiner

SYSTEM AND METHODS FOR CONTROLLING EMBEDDED DEVICES USING DEVICE STYLE SHEETS

TECHNICAL FIELD

The present invention relates generally to computers and computer-related technology. More specifically, the present invention relates to systems and methods for controlling embedded devices using device style sheets.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor (s).

Embedded systems may be utilized in a wide variety of different scenarios. For example, lighting systems may utilize embedded technology. In particular, an embedded system may be used to monitor and control a lighting system. For example, an embedded system could be used to dim or increase the brightness of an individual light or a set of lights within a lighting system. An embedded system may be used to create a specific lighting pattern by activating individual lights within the lighting system. Embedded systems may be coupled to individual switches within the lighting system. An embedded system may instruct the switches to power up or power down individual lights or the entire lighting system. The brightness or power state of each individual light may thus be controlled by the embedded system.

Security systems may likewise utilize embedded technology. An embedded system may be used to control and monitor the individual security sensors within a security system. An embedded system may provide controls to power up each of the security sensors automatically at a specific time of day or night. An embedded system may be coupled to a motion sensor. The embedded system may power up the individual motion sensor automatically and provide controls to activate a video camera and active an alarm, if motion is detected. Embedded systems may also be coupled to sensors monitoring a door or a window and take specified action when activity is sensed.

Embedded technology may also be used to control wireless products, such as cell phones. An embedded system may provide instructions to power up the display of the cell phone. An embedded system may also activate the audio speakers within the cell phone to provide the user with an audio notification of an incoming call.

Home appliances, such as stoves, refrigerators, or microwave ovens, may also incorporate embedded technology. For example, a massage recliner may incorporate an embedded system to provide instructions to automatically recline the back portion of the chair according to the preferences of the user. The embedded system may also provide instructions to initiate the oscillating components within the chair according to the preferences of the user.

Additional products typically found in homes may also incorporate embedded systems. For example, an embedded system may be used within a toilet to control the level of water used to refill the water supply tank. Embedded systems may be used within a jetted bathtub to, for example, control the outflow of air.

Unfortunately, computer systems have not yet been effectively utilized to manage environmental control devices (e.g., lighting and heating/cooling systems) throughout a home or office building. It could be very complex, for instance, to establish standardized lighting, heating/cooling, and security modes for late in the evening (for example, when no one is at an office building), for the work day, or to set a romantic or peaceful mood at home. Also, managing the lighting and heating/cooling systems through use of centralized computer technology in the current state-of-the-art within such a building can be extraordinarily complex and requires a high degree of technical skill.

Accordingly, benefits may be realized by improved systems and methods for controlling ambiance devices. Some exemplary systems and methods for controlling ambiance devices utilizing device style sheets are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
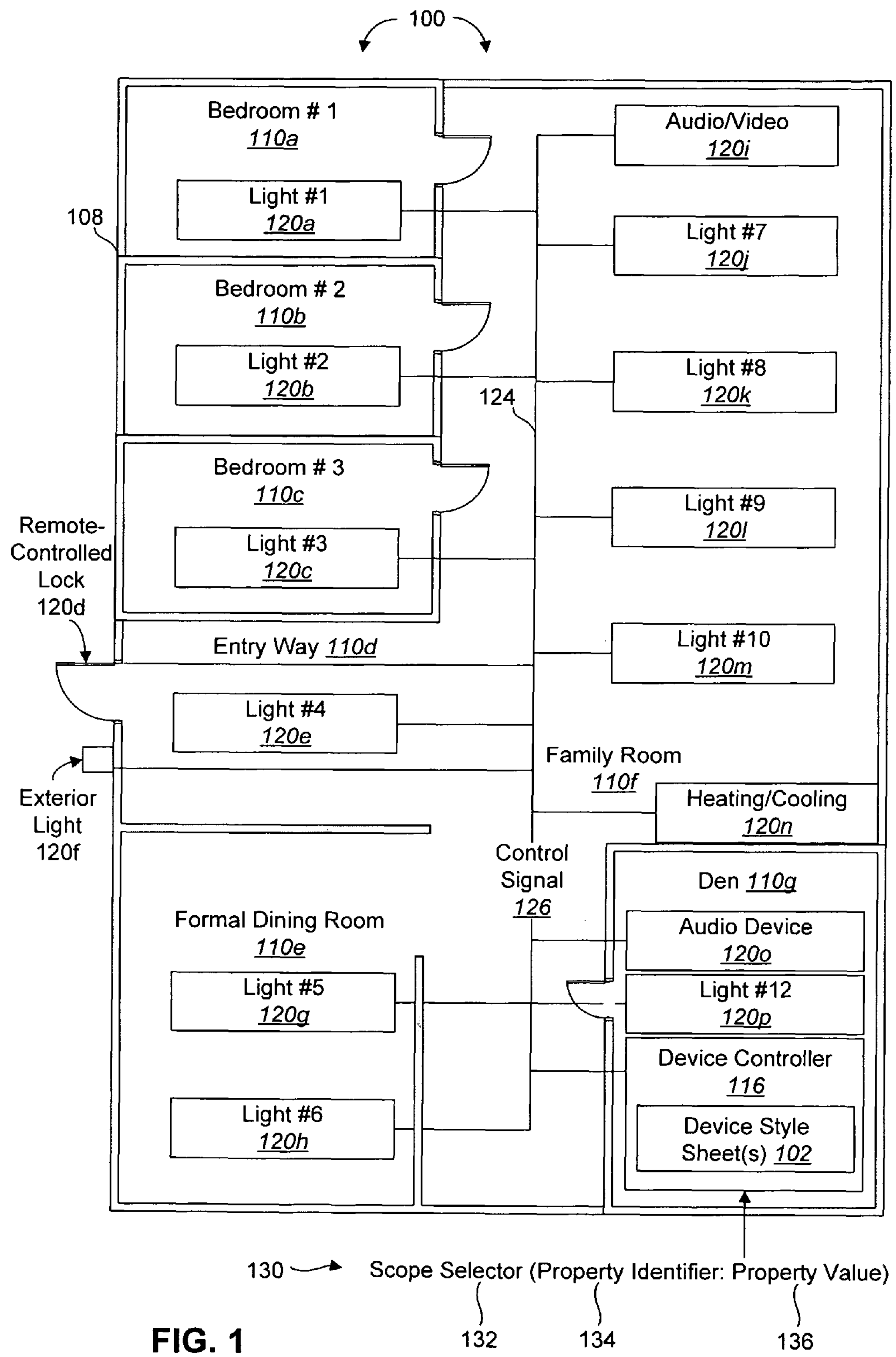
FIG. 1 is a block diagram of one embodiment of an ambiance control system including one or more device style sheets shown within one embodiment of a home.

A method for controlling embedded devices using a device style sheet is disclosed. A data signal identifying a device style sheet declaration is received at the embedded device controller. The device style sheet may comprise a property identifier that identifies a style property to be altered and a property value that identifies a style property value to be applied. At least one embedded device in electronic communication with the embedded device controller is identified. A control signal for the embedded device is formulated based on the property identifier and property value. The control signal is transmitted to the embedded device.

The style sheet declaration may further comprise, in one embodiment, a scope selector that identifies a scope of a style to be applied. The method may further comprise determining the capabilities of the embedded device. In such a case, the control signal may be additionally formulated based on the capabilities of the embedded device. In one configuration, the property value comprises a prioritized list of property values.

The method may further comprise receiving a style sheet declaration from an external computing device. The external computing device may be a computer game system. The style sheet declaration, in such a case, may correspond to events taking place within a game being played on the game system.

In one embodiment, the embedded device is an ambiance device configured to control at least one aspect of an environment. The embedded device may comprise a set style sheet, and formulating a control signal may then comprise formulating a control signal that will be recognized by the embedded device. Alternatively, the embedded device may comprise a modifiable style sheet.

A system to perform the foregoing method is also disclosed. An ambiance control device and an ambiance device are in electronic communication. The ambiance control device includes memory and a processor. Instructions are stored in memory to implement the foregoing methods in its various embodiments. A computer-readable medium for performing the disclosed method in connection with an ambiance control device and an ambiance device controller are also disclosed.

A system is further disclosed for implementing the foregoing method in connection with a peer-to-peer network. A first and a second ambiance control device, which are in electronic communication with each other, are utilized. The first ambiance control device includes memory and a processor in electronic communication with each other. Instructions are stored in the memory for receiving a style sheet declaration, formulating a control signal based on the style sheet declaration, and transmitting the control signal to the second ambiance control device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram of one embodiment of an ambiance control system 100 including one or more device style sheets 102 shown within one embodiment of a home 108. The home 108 includes various bedrooms 110*a-c*, an entryway 110*d*, a formal dining room 110*e*, a family room 110*f*, and a den 110*g*. The diagram of FIG. 1 depicts the first floor of the home 108. For simplicity, the second floor is not shown.

The home 108 illustrated in FIG. 1 is, of course, only exemplary. The ambiance control system 100 may be utilized in various environments, such as an office building, an apartment complex, a neighborhood, or a city.

The ambiance control system 100 illustrated in FIG. 1 includes a device controller 116 and various ambiance devices 120*a-p*. The device controller 116 and the ambiance devices 120 are in electronic communication with each other via a network 124.

The network 124 may be embodied in various ways. For example, the network 124 may include local area networks (LANs), storage area networks (SANs), metropolitan area networks (MANs), wide area networks (WANs), or combinations thereof (e.g., the Internet) with no requirement that the device controller 116 and ambiance devices 120 reside at the same physical location, within the same network 124 segment, or even within the same network 124. A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, wireless networks (e.g., 802.11g), proprietary formulas, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network." The network 124 may also comprise, in one embodiment, an embedded device network produced by Matsushita Electric Works, Ltd. of Osaka, Japan. An embedded device network comprises distributed networks of requestors, providers, and intervening nodes that allow rapid re-routing of communication channels when network failures occur.

Each room or area in the illustrated home 108 includes one or more ambiance devices 120. Ambiance devices 120 are devices used to control an environment in a room or area, such as lights 120*a-c*, 120*e*, 120*g-h*, 120*j-m*, 120*p*, audio/video devices 120*i*, audio devices 120*o*, a heating/cooling system 120*n*, and/or a remote-controlled door lock 120*d*. The ambiance devices 120 may be embodied in various ways and may include numerous different types of devices beyond those enumerated herein. An ambiance device 120 could, for example, include remote-controlled shutters that regulate how much natural light is admitted into a particular room or area or a telephone system to control, for example, whether incoming calls are sent to voice mail or whether the ringer is silenced. In one embodiment, ambiance devices 120 utilize embedded computer technology.

The device controller 116 may be embodied in various ways. For example, the device controller may be an embedded hardware device or a laptop computer, a desktop computer system, a tablet PC including hardware and/or software to perform the functions of the device controller 116. In a peer-to-peer network, the functions of the device controller 116 may be performed by one or more peer node devices (e.g., another ambiance device 120), as will be explained in further detail in connection with FIG. 6A.

The device controller 116 transmits or routes control signals 126 to ambiance devices 120 to alter the state of each such device 120, which receives such a signal. The device controller 116, for example, may send a control signal 126 via the network 124 to turn light #3 120*c* "on" or "off." In addition, the device controller 116 could, if light #3 120*c* supports various lighting levels, set light #3 120*c* to a specific lighting level (e.g., lighting level 1-10). Depending on the programming code in effect in the ambiance device 120, different types of control signals may be transmitted to cause a change in state of a particular ambiance device 120, as will be discussed below in connection with subsequent figures. The device controller 116 may, in one embodiment, be an OAS device produced by Matsushita Electric Works, Ltd. of Osaka, Japan. An OAS device acts as a router between resource-limited electronic devices and client software that may be speaking different protocols.

The type and scope of control signals 126 transmitted by the device controller are governed, in part, by device style sheets 102. Device style sheets 102 (which may be embodied as programming code stored as software, hardware, or a combination of the two) enable manipulation of multiple ambiance devices 120 using a single device style sheet declaration 130. Device style sheets 102 may be stored or be accessible by the device controller 116 (as shown in FIG. 1) and/or may be stored at an ambiance device 120.

Figure 2:
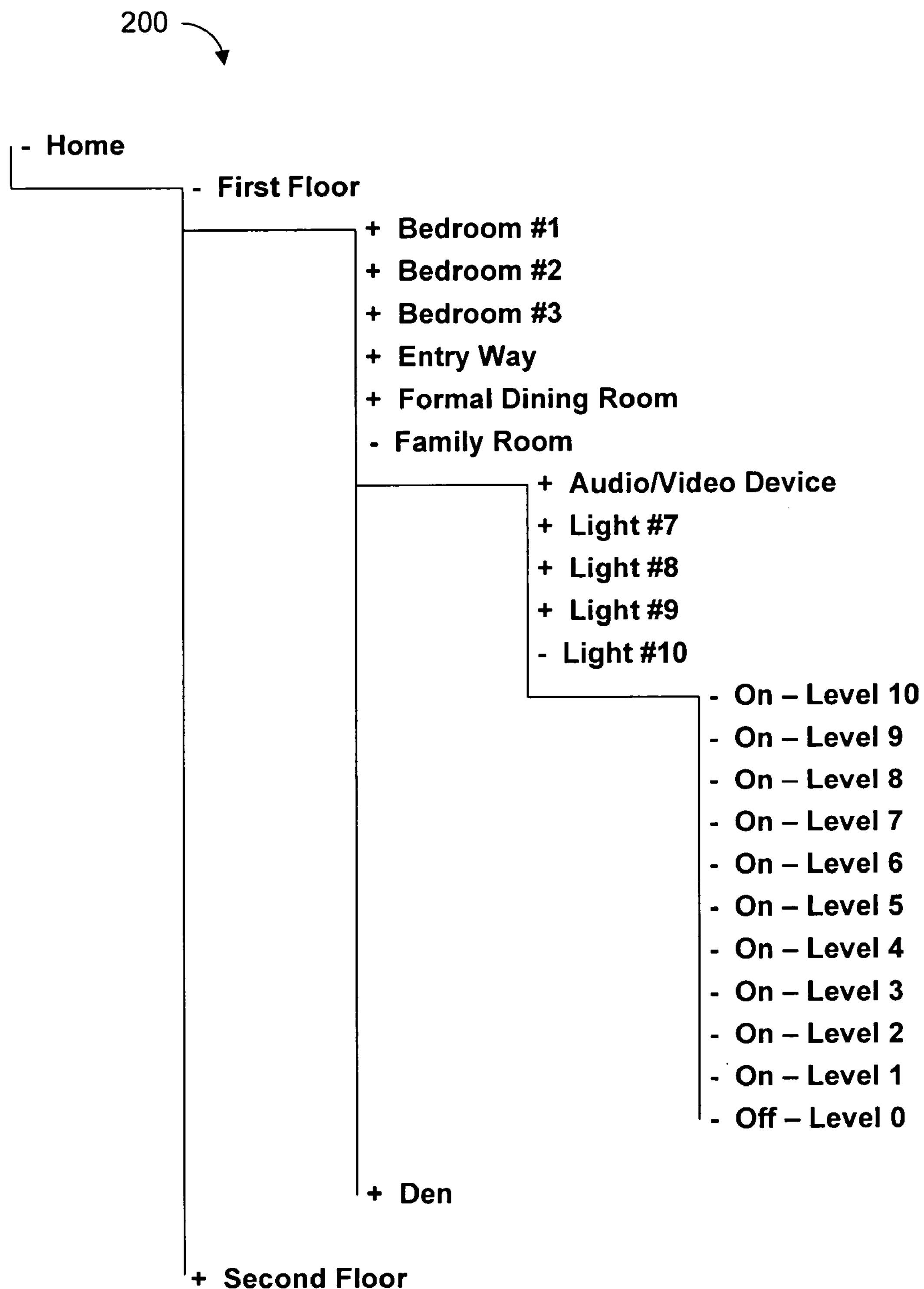
FIG. 2 is a diagram illustrating the hierarchical level of rooms or areas, and ambiance devices shown in FIG. 1.

In one embodiment, the style sheet declaration 130 includes a scope selector 132, a property identifier 134, and a property value 136. The scope selector 132 determines the scope of ambiance devices 120 to which a style will be applied, i.e., the ambiance devices 120 to which a control signal 126 will be transmitted. Referring briefly to FIG. 2, for example, the scope of a particular style may be the entire home, the first floor, the second floor, a particular light, audio device, or bedroom.

Referring once again to FIG. 1, the property identifier 134 indicates the type of property to be altered within the selected scope. The property value 136 is the type of value to be applied within the selected scope. For example, in one embodiment, the following style sheet declaration 130, when received by the device controller 116, would cause the device controller to transmit control signals 126 to Lights #7-10 120*j-m* (all the lights in the family room 110*f*) to "off":

FamilyRoom (Lighting: Off)

Of course, a property value for such a style sheet declaration 130 could be set to "on," "low," or level 1-10, depending upon the capabilities of the lighting devices within the family room 110*f*.

More abstract property identifiers may be used. For example, the following style sheet declaration 130 could be used to control multiple devices within the den 110*g*:

Den (Mood: Scary)

This style sheet declaration 130 could, in one embodiment, cause Light #12 to be set to light level "2" and cause the audio device 120*o* to begin playing Halloween music. If such a style sheet declaration 130 were sent to the family room 110*f*, the lighting could be set to "low" and a selection of horror movies could begin to play on the audio/video device 120*i*. Other more abstract style sheet declarations 130 could include, for example:

Bedroom#1 (TimeOfDay: dawn)

FamilyRoom (Location: city-street)

FormalDiningRoom (Weather: thunderstorm)

EntryWay (Weather: partly-cloudy)

Style sheet declarations could also include multiple scope selectors 132, multiple property identifiers 134, or both, as shown below:

Bedroom#1, Bedroom#2, Bedroom#3 (TimeOfDay: Dawn)

Den (Lighting: 5; Sound: Peaceful)

Den, FamilyRoom (Lighting: 5; Sound: Peaceful)

Device style sheets 102 may thus be used to control multiple ambiance devices 120 and multiple types of devices 120 with a single style sheet declaration 130.

The device style sheets 102, in one embodiment, are configurable by an end-user to allow the end-user create or modify a style sheet 102 to the end-user's tastes. In addition, device style sheets 102 may be pre-configured and, for example, downloaded from a remote server. Pre-configured style sheets 102 may be utilized by the device controller 116 or an ambiance device 120 for use with a particular type of ambiance device 120 or by ambiance devices 120 produced by a certain manufacturer or a consortium of manufacturers. Pre-configured style sheets may, in one embodiment, be modified by an end-user. A device style sheet 102 could include setting conducive to any type of activity, such as eating meals, studying, sleeping, watching television or playing games.

As indicated above, device style sheets 102 may be stored at the device controller 116, at each ambiance device 120, or at both locations. Utilizing device style sheets 102 at each ambiance device 120 enables these devices 120 to receive and process property identifiers 134 and property values 136 of a complexity level similar to the device controller 116. For example, if Light #7 120*j* includes a style sheet for the "Mood" property, a signal corresponding to "Mood: Romantic" could be received and processed by this device 120. Within Light #7 120*j*, the "Mood: Romantic" command could be mapped to, or correspond to, for example, a lighting level of "3" on a scale of 1 to 10.

The creation and formulation of style sheet declarations 130 that may be received by the device controller 116 may be achieved in various ways. For example, a user may create style sheet declarations 130 at a device integrated with the device controller 116, such as a personal computer that includes software for creation of sheet declarations. Alternately, style sheet declarations 130 may be created at a remote system and transmitted to the device controller 116 for execution/routing.

The format of the style sheet declaration 130 shown in FIG. 1 is merely exemplary. Style sheet declarations 130 may be formatted in various ways. For example, the scope selector 132, property identifier 134, and property value 136 may be placed in a different order. The syntax of the declarations may also be altered, such as omitting commas or replacing commas with semicolons, etc.

Ambiance control systems 100 can be used in a wide variety of different configurations. For example, an ambiance control system 100 could be utilized to customize exercise equipment to a specific user or group of users. These systems 100 could also be utilized to customize kitchen appliances and shelving to act in concert for the convenience of a user in preparing specific meals.

FIG. 2 is a diagram 200 illustrating the hierarchical level of rooms or areas, and ambiance devices 120 shown in FIG. 1. Within FIG. 2, a minus sign ("–") indicates that at least one sub-level for a particular item is visible, while a plus sign ("+") indicates that sub-levels of the pertinent item on the diagram are not shown. As indicated in connection with FIG. 1, the scope selector 132 (shown in FIG. 1) of a particular device style sheet declaration 130 may identify, for example, one or more of the following: the entire home, a particular bedroom, or a particular ambiance device (such as the audio/video device).

Figure 3:
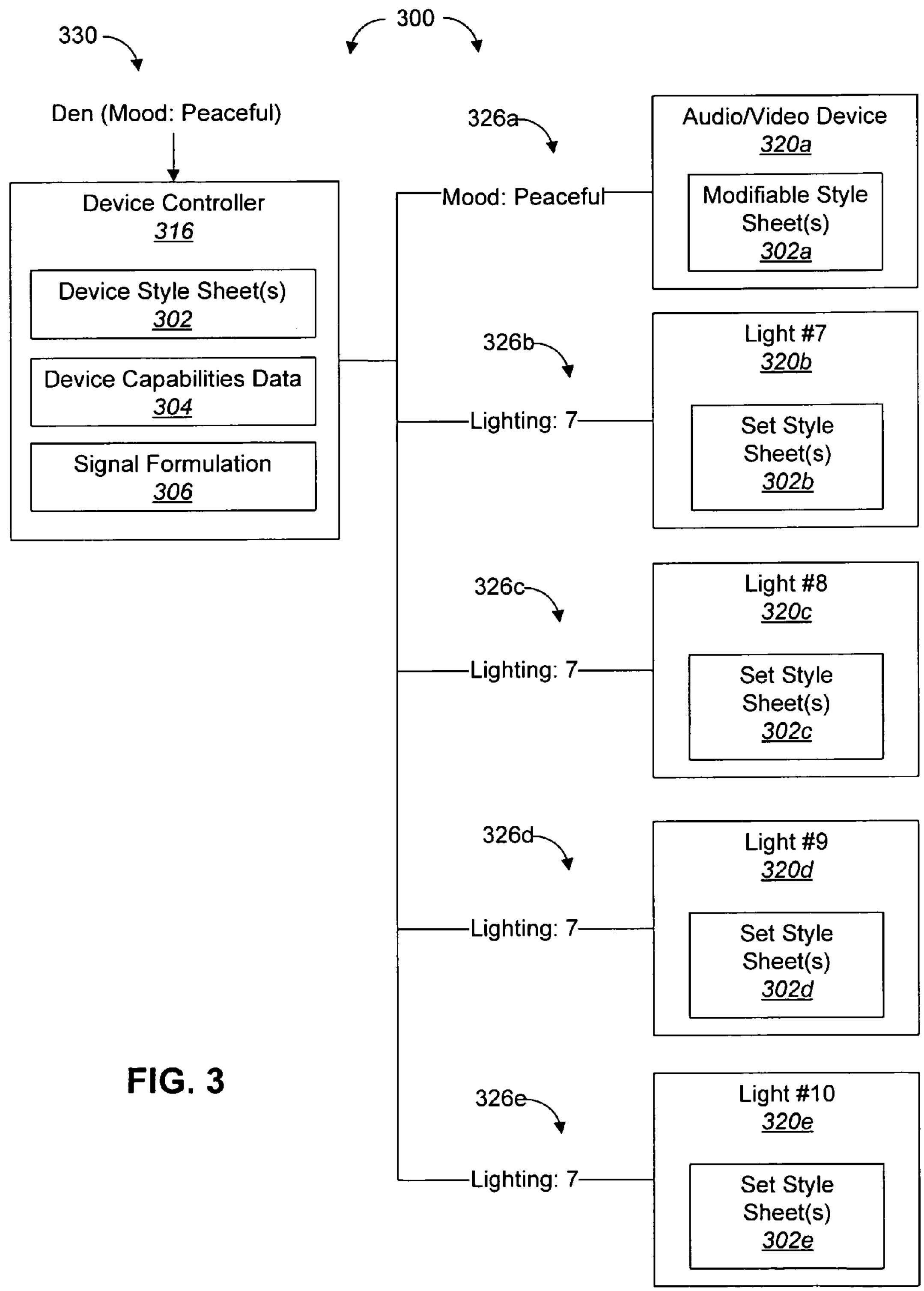
FIG. 3 is a block diagram illustrating one embodiment of an ambiance control system transmitting control signals to ambiance devices.

FIG. 3 is a block diagram illustrating one embodiment of an ambiance control system 300. The depicted embodiment illustrates a device controller 316 that is transmitting control signals 326 to various ambiance devices 320. In this embodiment, the style sheet declaration statement 330 received at the device controller is "Den (Mood: Peaceful)."

In the illustrated embodiment, the device controller 316 includes device style sheet(s) 302, device capabilities data 304, and a signal formulation component 306. As indicated above, the device style sheets 302 include programming code embodied in hardware, software, or a combination of the two that enable adjustment or manipulation of multiple ambiance devices 320 using a single device style sheet declaration 330.

The device capabilities data 304 comprises data that indicates the capabilities of ambiance devices 320 coupled to the device controller 316. For example, this data 304 may indicate whether an illumination ambiance device supports only "on" and "off" or whether it supports multiple levels of lighting. The data 304 may also indicate whether a particular device 320 includes device style sheets 302 or related capabilities that enable it to receive and process complex device properties, such as "Mood," "Weather," etc. The data 304 may thus indicate whether a particular ambiance device is "intelligent" (supports highly complex control signals 326) or is "dumb" (e.g., supports only very simple control signals 326).

The signal formulation component 306 may communicate with or utilize device style sheets 302 and device capabilities data 304 to determine what type of control signal 326 may be transmitted to a particular type of ambiance device 320. In one embodiment, for example, the signal formulation component 306 mitigates the risk that a highly complex control signal 326 could be sent to a "dumb" device 320 that does not support such a complex command. Instead, a control signal 326 that will be recognized by the device 320 in question may be transmitted.

In the embodiment shown in FIG. 1, the device controller 316 has determined that the audio/video device 320*a* can receive and process the "Mood: Peaceful" control signal 326*a*. In response to receipt of such a command, the audio/video device 320 may play, for example, peaceful and soothing music. On the other hand, Lights #7-11 320*b-e* are not as "intelligent" (i.e., these devices will not support the "Mood" property identifier) and, accordingly, the device controller 316, utilizing the signal formulation component 306 has transmitted the control signal "Lighting: 7" to set these devices 320. The control signal is configured to set Lights #7-11 to lighting intensity level "7" on a scale of 1 to 10.

The embodiment shown in FIG. 3 is merely an example that illustrates one potential scenario in which the disclosed systems and methods may be used. The type of style sheet declaration statements 330, device controllers 316, and ambiance devices 320 may all be embodied in various ways within the scope of the disclosed systems and methods.

For example, in one embodiment (not illustrated), the lighting devices 320 are very basic and can receive and process only an "on" or "off" control signal. In such an embodiment, the device controller 316 utilizing the formulation component 306 could formulate a set of control signals 326 to best achieve the "Peaceful" mood. This could be achieved, in one exemplary embodiment, by sending an "off" control signal to Lights #7-9 320*b-d* and sending an "on" control signal to Light #10 320*e*, to leave only one light on within the family room 120*f* (shown in FIG. 1), if these Lights 320*b-d* were situated in such a room. Accordingly, the device controller 316 may translate a device style sheet statement 330, using the signal formulation component 306, to achieve a desired mood or best satisfy the defined criteria.

As indicated in FIG. 3, the ambiance devices 320 may include device style sheets 302, enabling direct receipt and processing of device style sheet declarations 330. Of course, in such a case the scope selector 132 (shown in FIG. 1) is not necessary if the style sheet declarations have been filtered or limited to declarations that apply to the ambiance device 320 receiving the declaration. In this case, the scope will always be the device 320 receiving the declaration 330. As a result in one embodiment, the control signal 326 may be a control signal identifying the property identifier 134 and the property value 136 received by the device controller 316. In one embodiment, the device controller 316 could send all style sheet declarations to each device 320. The individual device 320 could determine which declarations apply to the device 320 or simply ignore declarations the device 320 does not understand.

The audio/video device 320*a* shown in FIG. 3 includes modifiable style sheet(s) 302*a*. As a result, the styles sheets 302*a* utilized by the audio/video device 320 can be modified by a user or changed using new or updated style sheets 302*a*. In one embodiment which utilizes modifiable style sheet(s) 302*a*, the following functions and events may be utilized to update style sheets 302*a* within a device:

Functions

Get( )—Returns a style sheet

GetProperty(string propertyName)—Returns a particular style property

GetValues(string propertyName)—Returns an array of values for a property

GetProperties( )—Returns an array of all properties

Events

Changed( )—Fires when the style sheet has been changed

PropertyChanged(string propertyName)—Fires when a property has been changed

In contrast to modifiable style sheets 302*a*, the lighting devices 320*b-e*, Lights #7-10, include set style sheets 302*b-e*. As a result, these style sheets 302*b-e* cannot be modified. Accordingly, the type of control signals 326 that can be processed cannot be altered.

Figure 4:
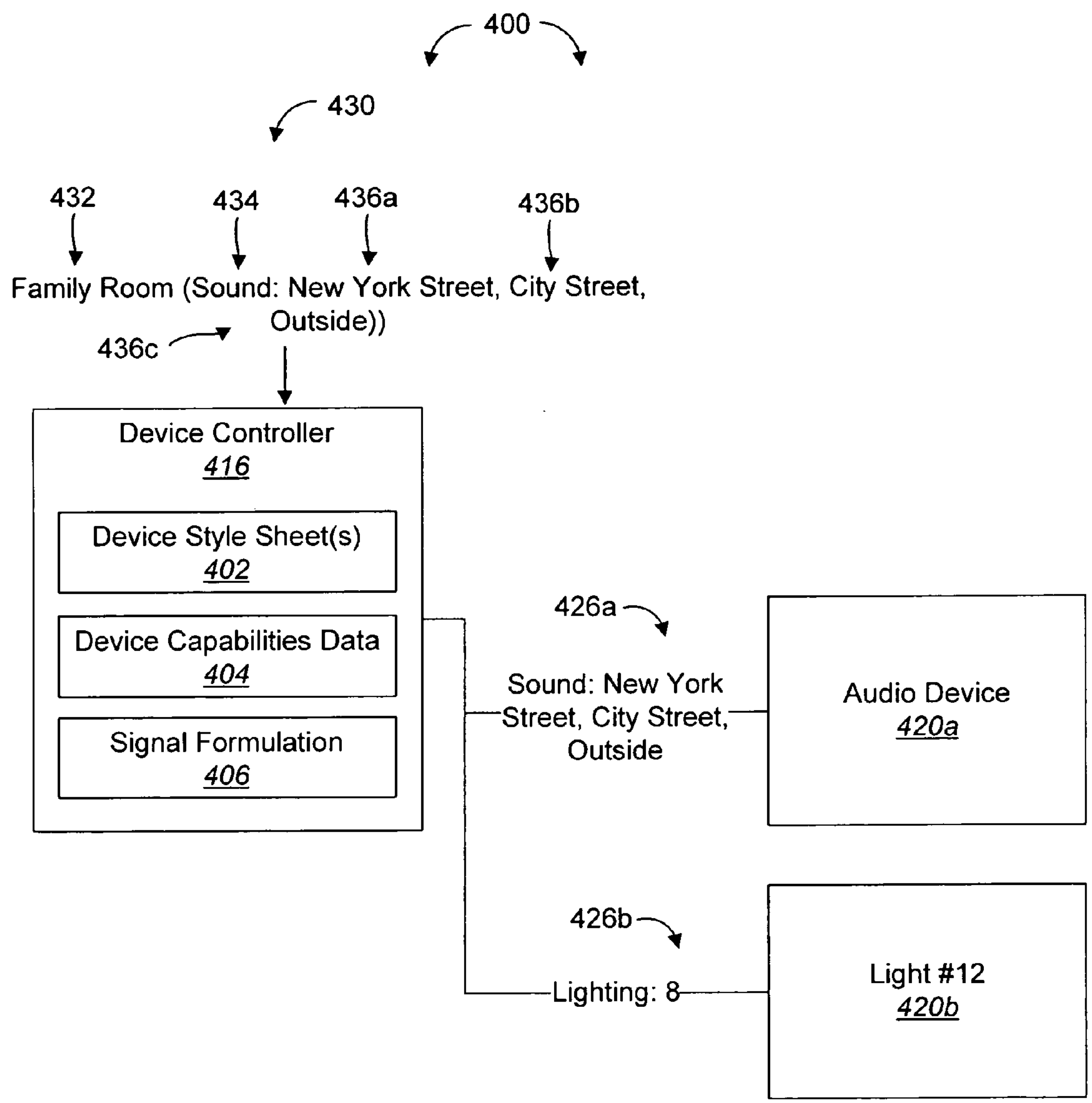
FIG. 4 is a block diagram illustrating an alternative embodiment of an ambiance control system including prioritized property values.

FIG. 4 is a block diagram illustrating an alternative embodiment of an ambiance control system 400. The illustrated ambiance control system 400 includes a device controller 416 and various ambiance devices 420. Again, the device controller may include device style sheets 402, device capabilities data 404, and a signal formulation component 406.

In this embodiment, the device controller 416 may receive and process a data signal identifying a device style sheet declaration 430, having prioritized property values 436*a-c*. Prioritized property values 436*a-c* comprise a sequence of two or more property values 436*a-c*. The first property value 436*a* is the most desired property value 436, and the second property value 436*b* is the second most desired and so on. If the device 420 supports the first property value 436*a*, the state of ambiance devices 420 within the specified scope is altered to match the first property value. If the first property value 436*a* is not supported, an attempt is made to alter the state of one or more of the ambiance devices 420 to the second property value and so on. Thus, a user may specify the sequence of property values 436 which may be applied to a particular device or set of devices 420. Prioritized property values 436 may be particularly valuable when ambiance devices ignore control signals 426 that cannot be understood or interpreted.

In the embodiment illustrated in FIG. 4, the device controller will attempt to apply the "Sound" property values "New York Street," "City Street," and "Outside" to the Audio Device 420. For these prioritized property values 436 may be sent in sequence to the ambiance device 420 or as a single group.

In one embodiment, prioritized values 436 may be generated by the device controller 416, although a non-prioritized style sheet declaration has been received. This may occur, for example, when the device controller 416 is unable to determine which property identifiers 434 or property value 436 a particular control device 420 supports.

Figure 5:
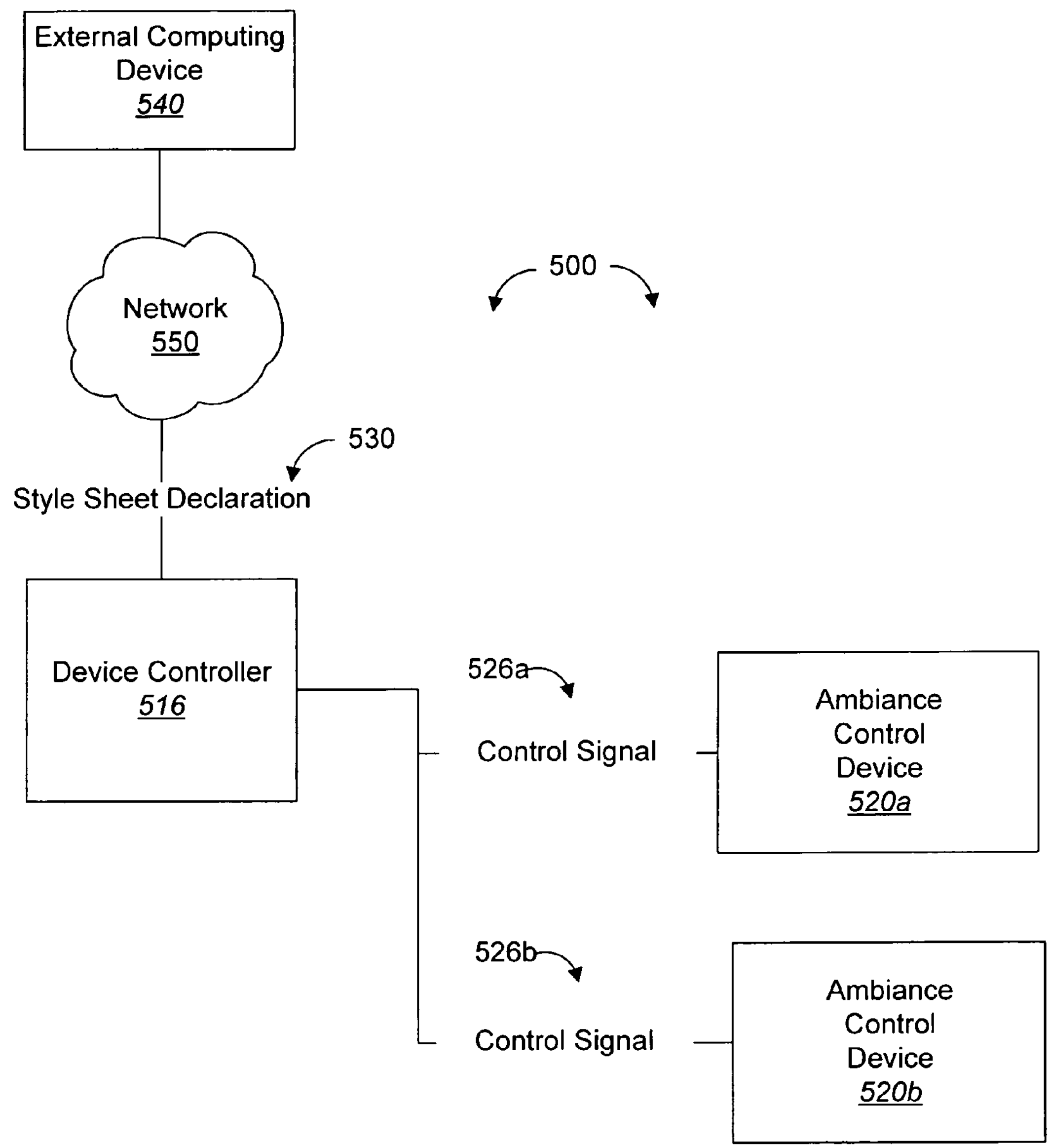
FIG. 5 is a block diagram of one embodiment of an ambiance control system coupled to an external computing device by a network.

FIG. 5 is a block diagram of one embodiment of an ambiance control system 500 coupled to an external computing device 540 by a network 550. The ambiance control system 500, as with previously disclosed embodiments, includes a device controller 516 and various ambiance devices 520. In this embodiment, an external computing device 520 is in communication with the device controller 516 via a network 550. As with the network 124 disclosed in FIG. 1, the network 550 illustrated in FIG. 5 may be embodied in various ways, such as a wired network, wireless network, or another communication channel (e.g., a USB cable).

The external computing device 540 generates device style sheet declarations 530 that are received by the device controller 516 and are used to alter the state of ambiance devices 520. This external computing device 520 could include, for example, a personal computer containing software and/or hardware that may be utilized to generate device style sheet declarations 530 that are transmitted to the device controller 516. If a user of the system is, for example, on vacation, the user may transmit device style sheet declarations (e.g., "Home (Mode: Sleep)") to place the home into a sleep mode (e.g., locking the front door and turning off all the lights except one) from a remote location via the Internet 550 or another network 550.

In an alternative embodiment, the external computing device 540 may be a computer game system. The game being played by the gaming system may generate device style sheet declarations 530 that correspond to events that are taking place within the game. For example, if the character in the game enters a cold cave, the lights in the room in which the person playing the game is located may be dimmed, and the air-conditioning system in the room may be activated. Lightning flashes could be simulated by pulsing lighting on and off in rapid sequence or the like. Accordingly, the systems and methods disclosed herein may be utilized to create a more immersive gaming experience by simulating game situations in the environment in which the game player is located.

Of course, the external computing device 540 could also be embodied in other ways, such as a DVD/video player where the style sheet declarations correspond to events taking place on the display screen; a simulation/education/training system, which may be very similar to the computer game system described above; or smart exercise equipment that alters the environment based on the type of exercise routine being performed.

Figure 6:
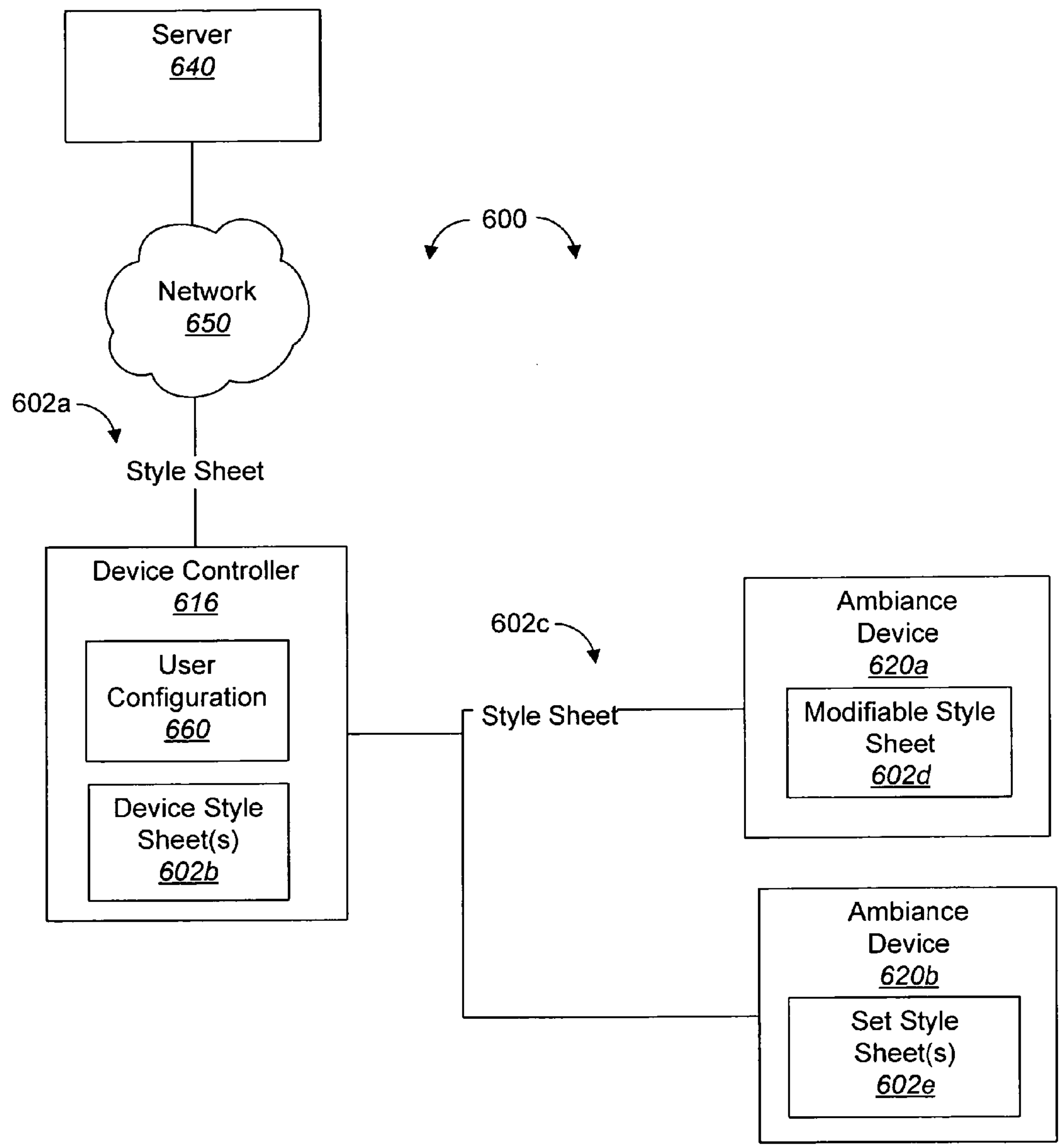
FIG. 6 is a block diagram illustrating an embodiment of an ambiance control system that utilizes pre-configured or user-configured device style sheets, together with a server and a network.

FIG. 6 is a block diagram illustrating an embodiment of an ambiance control system 600 that utilizes pre-configured or user-configured device style sheets 602, together with a server 640 and a network 650. In this embodiment, style sheets 602 may be downloaded via a network 650 from a server 640. The style sheets 602 may assist in working with ambiance devices 620 from a particular manufacturer or may involve style sheets 602 sold from a style sheet warehouse that enable interaction with many different types of devices 620. The downloaded style sheets 602*a* may be used to update, alter, or replace a modifiable style sheet 602*d*. Set style sheets 602*e*, in contrast, cannot be modified or updated.

Alternatively, style sheets may be configured by a user utilizing a user configuration component 660. Using this component 660, a user could create style sheets 602 that define relative relationships. For example, such a style sheet 602 could be created for heating and cooling a specific room that a user desires to be generally 4° cooler than the rest of the house (such as an exercise room). If a device style sheet declaration is received to alter the temperature of the home (e.g., Home (Temperature: 72)), each room in the house, except for the specified room, will be set to achieve the temperature of 72°. The specified room will be set to achieve a temperature of 68°. Such an embodiment would require that specific rules take precedence over general rules; otherwise, the general rule of setting the temperature for the entire house would erase the relative setting for the entire house. In an alternative embodiment, this setting could be reversed such that a general setting trumps a specific setting.

In addition, user configuration could enable a user to specify a vacation mode (e.g., Home (Mode: Vacation)) in which one light in the inner portion of the house is constantly left on. Also, various vacation mode property values may be specified (e.g., Home (Mode: Vacation 01); Home (Mode: Vacation 02); Home (Mode: Vacation 03)). A different vacation mode may fire at the beginning of each hour to alternate which light within the inner portion of the home is turned on, simulating the presence of someone within the home.

In another embodiment, a style sheet 602 may be configured to decrease air conditioning energy consumption for a group of homes or businesses by, for example, 1% when the supplying energy grid is near its breaking point. As a result, power outages may be avoided.

Figure 6A:
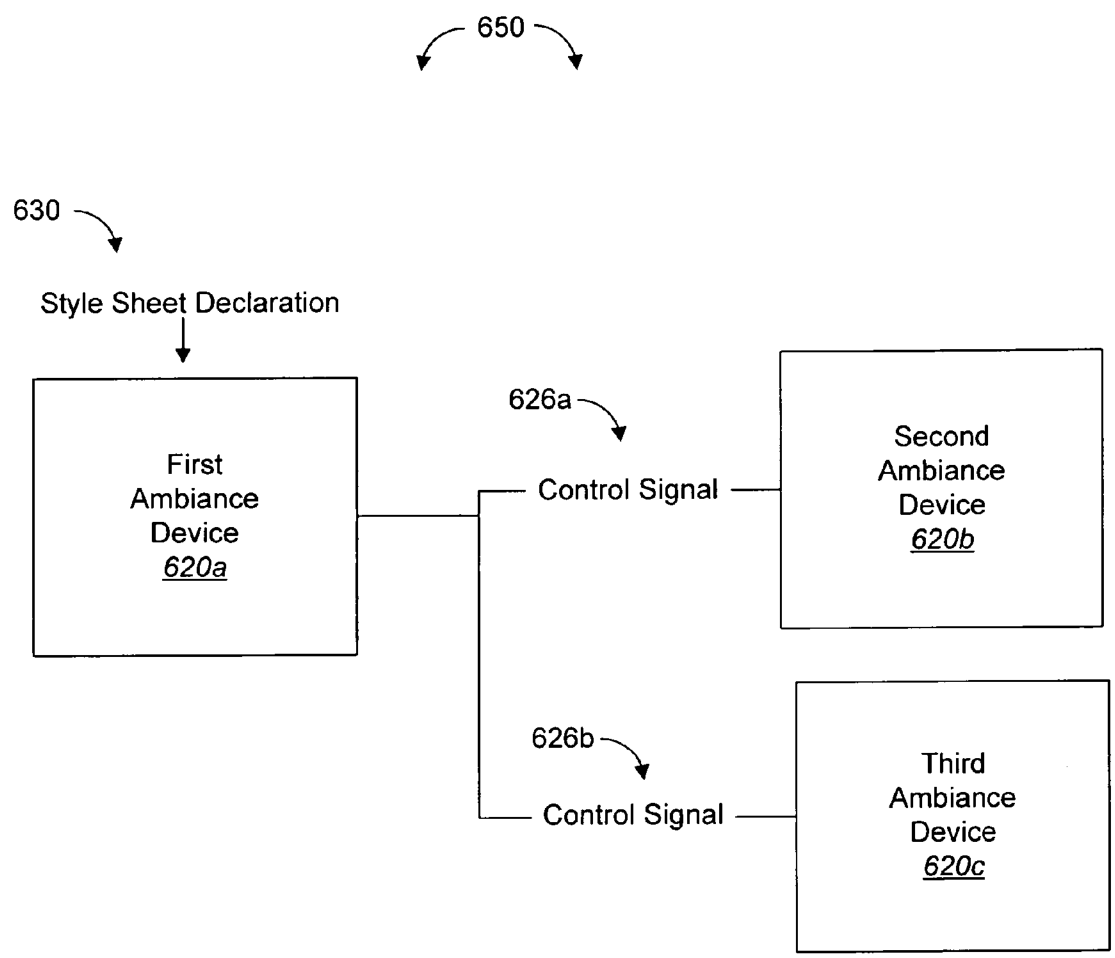
FIG. 6A is a block diagram illustrating an ambiance control device that is implemented in a peer-to-peer network.

FIG. 6A is a block diagram illustrating an ambiance control device 650 that is implemented in a peer-to-peer network. In this embodiment, a style sheet declaration 630 is received at a first ambiance device 620*a*. The first ambiance device 620*a* then formulates a control signal 626 that may be transmitted to one or more other ambiance control devices 620, such as the second and third ambiance devices 620*b-c*, which are shown in FIG. 6A. As indicated above, the control signal 626 may simply be the style sheet declaration 630 in the same format it was received by the first ambiance device 620*a* or in a converted format thereof (e.g., excluding a scope selector, or rearranging or reformatting defined information). In one embodiment, each ambiance device 620 transmits a control signal 626 to at least one other ambiance device 620 until, for example, at least portions or variations of the information contained in the style sheet declaration 630 are propagated throughout the peer-to-peer network.

Each ambiance device 620 may be embodied in various ways. For example, one or more of the ambiance devices 620 may include device style sheets 302, device capabilities data 304, or a signal formulation component 306 (as shown in FIG. 3); or a user configuration component 660, modifiable style sheets 602*d*, or set style sheets 602*e* (as shown in FIG. 6). Furthermore, within a peer-to-peer network, a device controller 616 may or may not be present.

Figure 7:
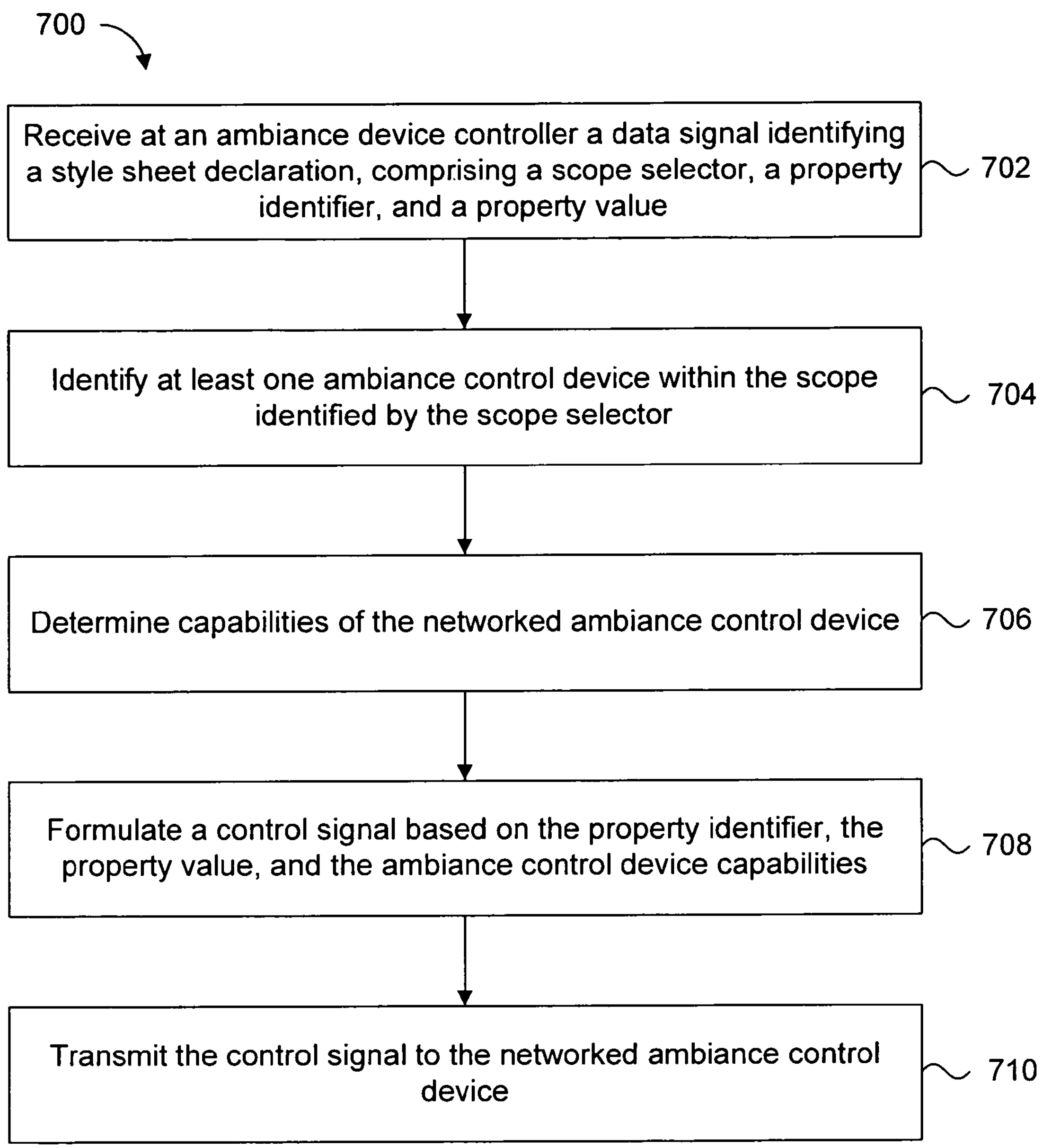
FIG. 7 is a flow diagram illustrating one embodiment of a method for controlling an ambiance device using a device style sheet.

FIG. 7 is a flow diagram illustrating one embodiment of a method 700 for controlling an ambiance device 620 using a device style sheet 602. A data signal identifying a style sheet declaration 530 is received 702 at an ambiance device controller. The style sheet declaration includes an optional scope selector 432, a property identifier 434, and a property value 436. The style sheet declaration may be created or formulated by software or a device integrated with the ambiance device controller and be received internally. Alternatively, the style sheet declaration may be generated by a device external to the ambiance device controller.

At least one ambiance device is identified 704 within the scope of ambiance devices identified by the scope selector. In one embodiment, the capabilities of the network ambiance device are determined 706.

Thereafter, a control signal is formulated 708 and transmitted 710 to the network ambiance device 620. In one embodiment, the formulation 708 of the control signal 526 is based on the property identifier, property value, and/or device capabilities. For example, if the ambiance device controller which will receive the control signal is "intelligent," a control signal identifying the property identifier and the property value may be transmitted. Alternatively, if the device that will receive the control signal does not support the property identifier, a new property identifier may be formulated that closely approximates the property identifier received at the ambiance device controller. The reformulated control signal may be then transmitted to the ambiance device for processing.

In an alternative embodiment, the ambiance device controller does not take into consideration the capabilities of ambiance devices, but merely transmits a control signal based on the received style sheet declaration. The received control signal may simply be ignored by the device, if it does not support the property in question. Alternatively, an "intelligent" device may re-map the property to another, supported property to approximate the desired ambiance.

Many different embodiments of the method 700 disclosed above are possible. For example, certain ambiance devices may include modifiable style sheets or set style sheets, as shown in FIG. 3. The style sheet declaration may include a prioritized list of property values, as illustrated in FIG. 4. The ambiance controlled device may be in electronic communication with an external computing device (such as a gaming system) that transmits style sheet declarations to the device controller, as illustrated in FIG. 5. As illustrated in FIG. 6A, a variation of the method 700 may be implemented within a peer-to-peer network.

Device style sheets provide significant advantages in managing ambiance devices. These advantages can be categorized into three areas:

- Easier to Make Broad Changes. Style sheets make it simpler to propagate changes that affect many ambiance devices. This is because changes can be made at one central location, and the style sheet and its effect can be propagated to all identified ambiance devices.
- Better Consistency. Because it is easier to make broad changes, it is also easier to ensure that all of the ambiance devices are working together in a consistent way.
- Piecemeal Override. Because, in one embodiment, specific rules supersede general rules, it is easy to set global rules and apply exceptions to specific cases.

In one embodiment, the foregoing advantages are made possible, in part, because device style sheets may utilize cascading style sheets and inheritance principles, in a manner similar to HTML Internet pages. For example, a device style sheet may incorporate elements or features of a device style sheet of a higher hierarchical level. When the element or feature is changed in the device style sheet of a higher hierarchical level, the element or feature will also be changed in the device style sheet that incorporated that feature or element. A new element or feature may be created in a subordinate device style sheet such that changes propagated in a style sheet of a higher hierarchical level will not affect the new feature or element. In one embodiment, options may be set to force subordinate device style sheets to inherit properties of a higher level device style sheet or, alternatively, not to do so.

Figure 8:
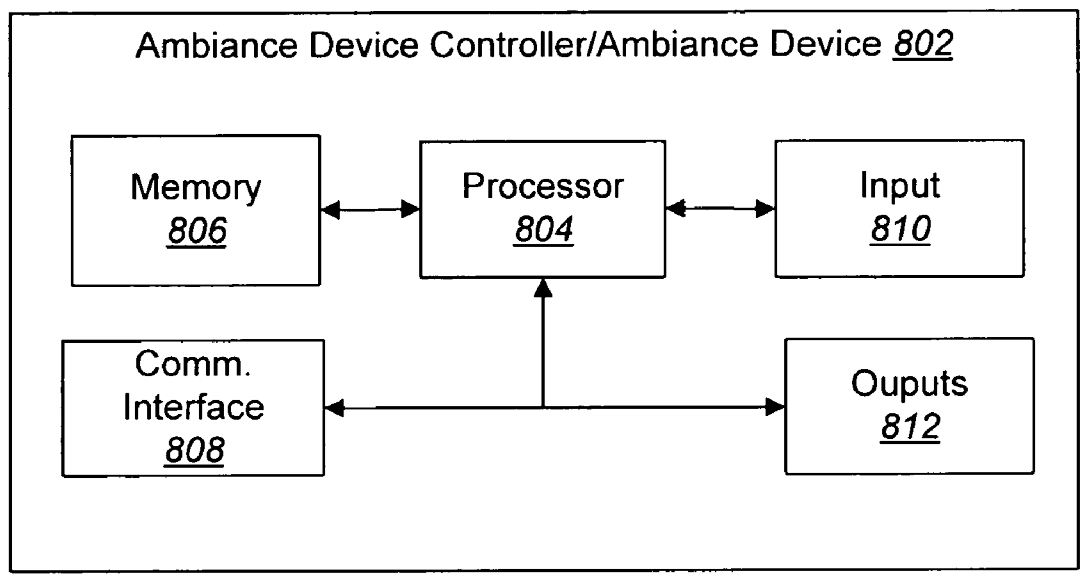
FIG. 8 is a block diagram illustrating the major hardware components typically utilized with embodiments of a device controller.

FIG. 8 is a block diagram illustrating the major hardware components typically utilized with embodiments of a device 802, such as an ambiance device controller or an ambiance device. A device 802 typically includes a processor 804 in electronic communication with various components of the device 802. The processor 804 controls the operation of the device 802 and may be embodied as a microprocessor, a microcontroller, a digital signal processor (DSP), or other device known in the art. The processor 804 typically performs logical and arithmetic operations based on program instructions stored within the memory 806.

The processor 804 may also be in electronic communication with a communication interface 808. The communication interface 808 may be used for communications with external computing devices, servers, ambiance devices, ambiance device controllers, storage devices, etc. Thus, the communication interface 808 of the device 802 may be designed to send or receive signals from other devices. The communication interface 808 may be based on wired communication technology, wireless communication technology, or both. Examples of different types of communication interfaces 808 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth.

The processor 804 may, in one embodiment, operably be connected to various input 810 and/or output 812 devices capable of electronic communication with the processor 804, or, in other words, with devices capable of input and/or output in the form of an electrical signal. Examples of different kinds of input devices 810 include a keypad, keyboard, mouse, microphone, remote control device, button, joystick, trackball, touchpad, touch screen, lightpen, etc. Examples of different kinds of output devices 810 include an LCD screen (for displaying the status or selected features of the device 802) and an audio speaker.

The device 802 may also include memory 806. The memory 806 may be a separate component from the processor 804, or it may be on-board memory 806 integrated with the processor 804. For example, microcontrollers often include a certain amount of on-board memory. As used herein, the term "memory" 806 is broadly defined as any electronic storage medium, such as read-only memory (ROM), random access memory (RAM), magnetic disk storage media, optical storage media, flash memory devices, on-board memory included with the processor 804, EPROM memory, EEPROM memory, registers, etc. The memory 806 typically stores program instructions and other types of data. The program instructions may be executed by the processor 804 to implement some or all of the methods disclosed herein. The memory 806 may also be used, for example, to store device style sheets.

In one embodiment, the device 802 is an embedded device. An embedded device stores much, if not all, of its programming code in read-only memory. An embedded device is not a general purpose computer, but generally performs a specific purpose, such as transmitting control signals to ambiance devices. In an alternative embodiment, the device controller may comprise a desktop computer, server, notebook or laptop computer, tablet PC, personal data assistant (PDA) or other type of computing device.

Figure 9:
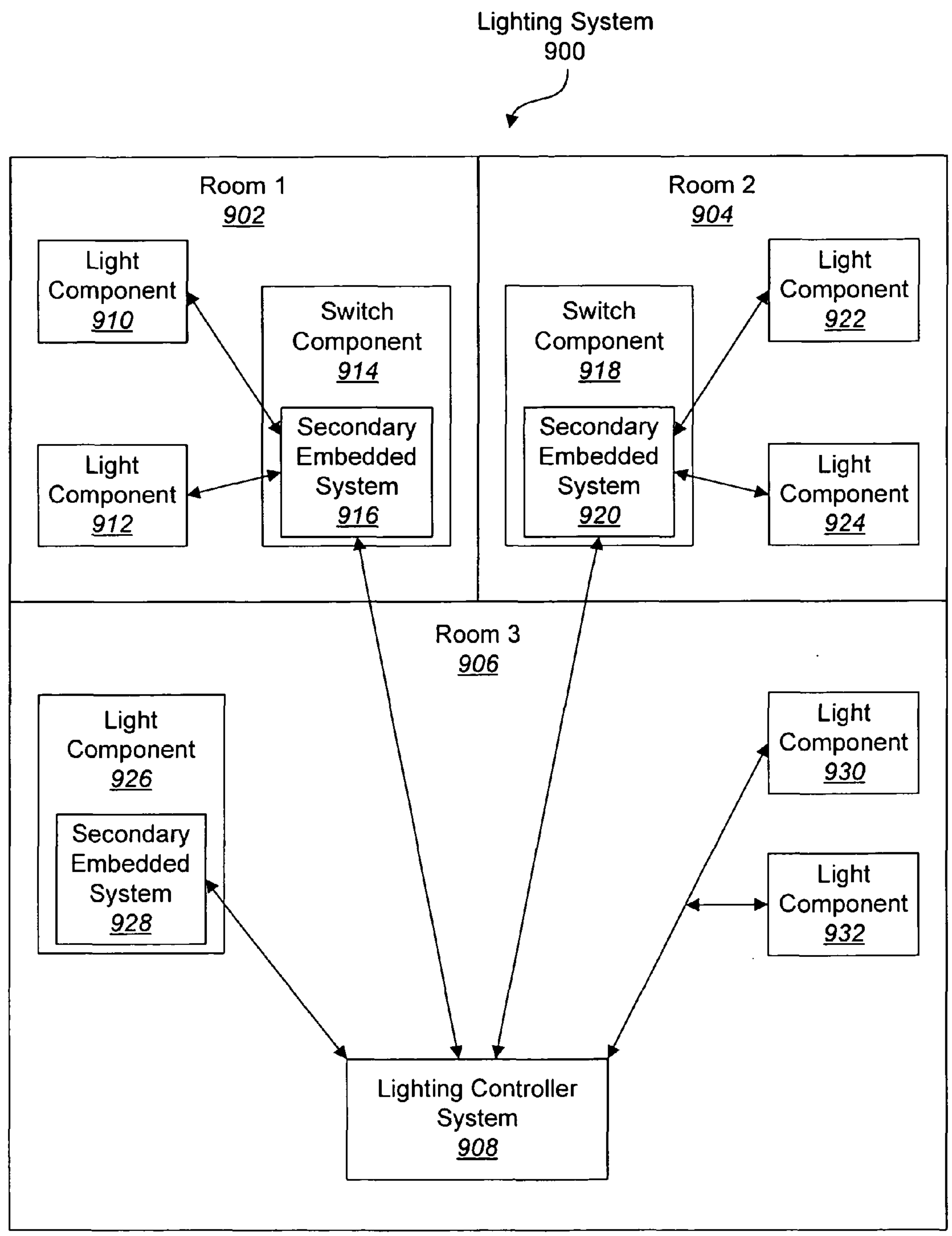
FIG. 9 is a block diagram illustrating a lighting system that may utilize the systems and methods disclosed herein.

The present systems and methods may be used in several contexts. FIG. 9 illustrates one embodiment of a system 900 wherein these systems and methods may be implemented. In particular, FIG. 9 is a block diagram that illustrates one embodiment of a lighting system 900 that includes a lighting controller system 908. The lighting system 900 of FIG. 9 may be incorporated, for example, into various rooms within a home. As illustrated, the system 900 includes a room 1 902, a room 2 904, and a room 3 906. This system 900 may be implemented in any number and variety of rooms within a home, dwelling, building, or other environment.

The lighting controller system 908 may monitor and control additional embedded systems and components within the system 900. In one embodiment, room 1 902 and the room 2 904 each include a switch component 914, 918. The switch components 914, 918 may also include a secondary embedded system 916, 920. The secondary embedded systems 916, 920 may receive instructions from the central lighting controller system 908. The secondary embedded systems 916, 920 may then execute these instructions. The instructions may include powering up or powering down various light components 910, 912, 922, and 924. The instructions may also include dimming or increasing the brightness of the various light components 910, 912, 922, and 924. The instructions may further include arranging the brightness of the light components 910, 912, 922, and 924 in various patterns. The secondary embedded systems 916, 920 may also facilitate monitoring and controlling each light component 910, 912, 922, and 924 through the central embedded system 908.

The lighting controller system 908 might also provide instructions directly to a light component 926 that includes a secondary embedded system 928 in room 3 906. The central embedded system 908 may, for example, instruct the secondary embedded system 928 to power down or power up the individual light component 926. Similarly, the instructions received from the central embedded system 908 may include dimming or increasing the brightness of the individual light component 926. The lighting controller system 908 may also monitor and provide instructions directly to individual light components 930, 932 within the system 900.

Figure 10:
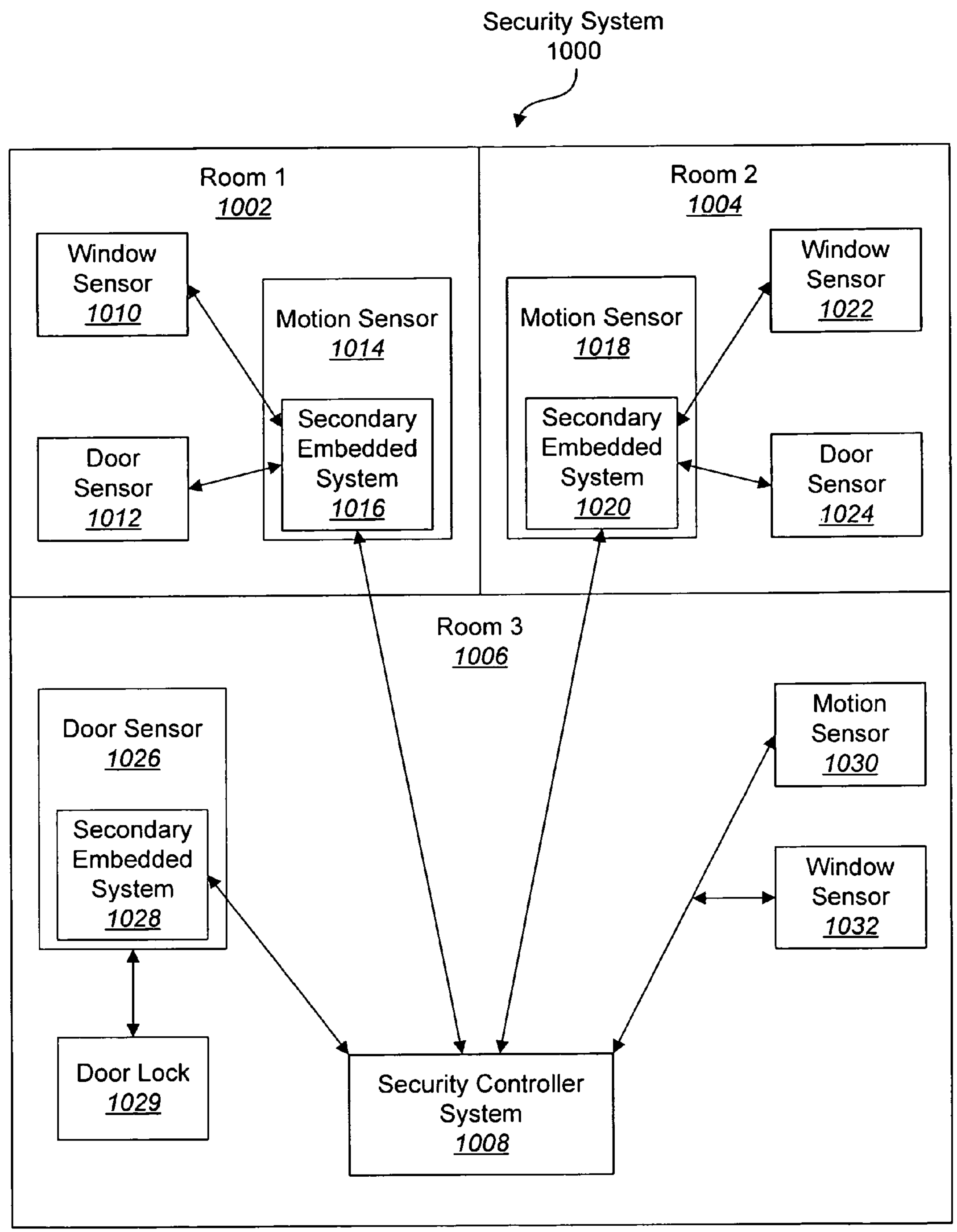
FIG. 10 is a block diagram illustrating a security system that may utilize the systems and methods disclosed herein.

FIG. 10 illustrates an additional embodiment of a system wherein the present systems and methods of the present invention may be implemented. In particular, FIG. 10 is a block diagram illustrating a security system 1000. As with the lighting system, the security system 1000, in the depicted embodiment, is implemented in a room 1 1002, a room 2 1004, and a room 3 1006. These rooms may be in the confines of a home or other enclosed environment. The system 1000 may also be implemented in an unenclosed environment where the rooms 1, 2 and 3, 1002, 1004, 1006 represent territories or boundaries.

The system 1000 includes a security controller system 1008. The security controller system 1008 monitors and receives information from the various components within the system 1000. For example, motion sensors 1014, 1018 in rooms 1 and 2 1002, 1004 may each include a secondary embedded system 1016, 1020. The motion sensors 1014, 1018 may monitor an area for motion and alert the security controller system 1008 when motion is detected via the secondary embedded systems 1016, 1020. The security controller system 1008 may also provide instructions to the various components within the system 1000. For example, the security controller system 1008 may provide instructions to the secondary embedded systems 1016, 1020 to power up or power down a window sensor 1010, 1022 or a door sensor 1012, 1024. In one embodiment, the secondary embedded systems 1016, 1020 notify the security controller system 1008 when the window sensors 1010, 1022 detect movement of a window. Similarly, the secondary embedded systems 1016, 1020 notify the security controller system 1008 when the door sensors 1012, 1024 detect movement of a door.

The security controller system 1008 may also monitor and provide instructions directly to individual components within the system 1000. For example, the security controller system 1008 may monitor and provide instructions to power up or power down a motion or window sensor 1030, 1032.

Each individual component comprising the system 1000 may also include a secondary embedded system. For example, FIG. 10 illustrates a door sensor 1026 including a secondary embedded system 1028. An electronic door lock 1029 is also shown. The security controller system 1008 may monitor and provide instructions to the secondary embedded system 1028 as similarly described above.

Figure 11:
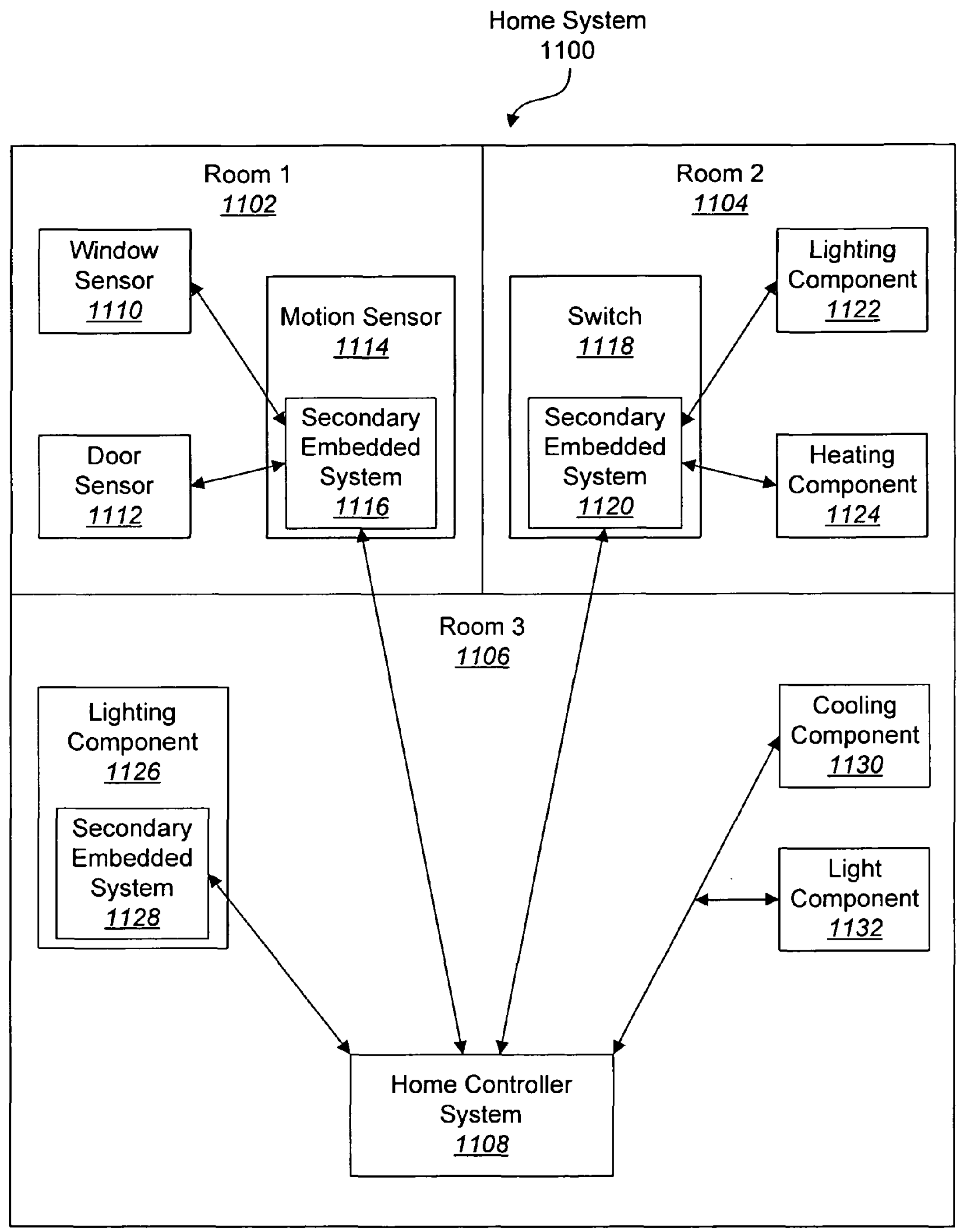
FIG. 11 is a block diagram illustrating a home controller system that may utilize the systems and methods disclosed herein.

FIG. 11 is a block diagram illustrating one embodiment of a home system 1100. The home system 1100 includes a home controller system 1108 that facilitates the monitoring of various systems, such as the lighting system 900, the security system 1000, and the like. The home system 1100 allows a user to control various components and systems through one or more embedded devices. In one embodiment, the home controller system 1108 monitors and provides information in the same manner as previously described in relation to FIGS. 9 and 10. In the depicted embodiment, the home controller system 1108 provides instructions to a heating component 1124 via a secondary embedded system 1120. The heating component 1124 may include a furnace or other heating device typically found in resident locations or offices. The home controller system 1108 may provide instructions to power up or power down the heating component 1124 via the secondary embedded system 1120.

Similarly, the home controller system 1108 may monitor and provide instructions directly to a component within the home system 1100, such as a cooling component 1130. The cooling component 1130 may include an air conditioner or other cooling device typically found in resident locations or offices. The home controller system 1108 may instruct the cooling component 1130 to power up or down depending on the temperature reading collected by the home controller system 1108. The home system 1100 functions in a similar manner as previously described in relation to FIGS. 9 and 10.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for controlling embedded devices using a device style sheet, the method comprising:

receiving at an embedded device controller a data signal identifying a single device style sheet declaration in one or more previously stored device style sheets, the single device style sheet declaration enabling manipulation of multiple types of embedded devices, the declaration comprising: a property identifier that identifies a style property to be altered;

a prioritized list of property values that identifies a style property value to be applied, wherein the prioritized list of property values comprises a sequence of two or more property values, wherein a first listed property value is used if supported, and wherein if the first listed property value is not supported, an attempt is made to use a next property value in the sequence until a supported property value is found; and a scope selector that identifies a scope of a style to be applied;

identifying at least two of the embedded devices within the identified scope in electronic communication with the embedded device controller;

determining capabilities of the identified embedded devices to receive and process complex control signals;

formulating, at the embedded device controller, a control signal for each of the identified embedded devices based on the capabilities of the identified embedded devices, the property identifier, and property value, wherein if it is determined that a particular embedded device does not support complex control signals, translating any complex control signal for the particular embedded device into a simple control signal that the particular embedded device supports; and transmitting the control signals to each of the identified embedded devices; wherein the previously stored device style sheets comprise cascading style sheets arranged hierarchically, wherein changing a feature in the device style sheet of a higher hierarchical level also changes the feature in the device style sheet that incorporated that feature.

2. The method of claim 1, further comprising receiving the style sheet declaration from an external computing device.

3. The method of claim 2, wherein the external computing device is a computer game system, and wherein the style sheet declaration corresponds to events taking place within a game being played on the game system.

4. The method of claim 1, wherein at least one of the identified embedded devices is an ambiance device configured to control at least one aspect of an environment.

5. The method of claim 1, wherein at least one of the identified embedded devices comprises a set style sheet, and wherein formulating a control signal comprises formulating a control signal that will be recognized by each identified embedded device with a set style sheet.

6. The method of claim 1, wherein at least one of the identified embedded devices comprises a modifiable style sheet.

7. A system that is configured for controlling ambiance devices using a device style sheet, the system comprising:
  an ambiance device controller having a memory and processor in electronic communication with each other;
  at least two identified ambiance devices within a scope for controlling at least one aspect of an environment, the identified ambiance devices and ambiance device controller being in electronic communication with each other;
  instructions stored in the memory, the instructions being executable to:
  receive at an ambiance device controller a data signal identifying a single device style sheet declaration in one or more previously stored device style sheets, the single device style sheet declaration enabling manipulation of multiple types of ambiance devices, the declaration comprising: a property identifier that identifies a style property to be altered; a prioritized list of property values that identifies a style property value to be applied, wherein the prioritized list of property values comprises a sequence of two or more property values, wherein a first listed property value is used if supported, and wherein if the first listed property value is not supported, an attempt is made to use a next property value in the sequence until a supported property value is found; and
  a scope selector that identifies the scope of a style to be applied;
  determine capabilities of the identified ambiance devices to receive and process complex control signals;
  formulate a control signal, at the ambiance device controller, for each of the identified ambiance devices based on the capabilities of the identified ambiance devices, the property identifier and property value, wherein if it is determined that a particular embedded device does not support complex control signals, translating any complex control signal for the particular embedded device into a simple control signal that the particular embedded device supports; and transmit the control signals to each of the identified ambiance devices;
  wherein the previously stored device style sheets comprise cascading style sheets arranged hierarchically, wherein changing a feature in the device style sheet of a higher hierarchical level also changes the feature in the device style sheet that incorporated that feature.

8. The system of claim 7, wherein the instructions are further executable to receive the style sheet declaration from an external computing device.

9. The system of claim 8, wherein the external computing device is a computer game system, and wherein the style sheet declaration corresponds to events taking place within a game being played on the game system.

10. The system of claim 7, wherein at least one of the identified ambiance devices comprises a modifiable style sheet.

11. A non-transitory computer-readable medium located within a memory device comprising executable instructions for controlling ambiance devices using a device style sheet, the instructions being executable to:
  receive at an ambiance device controller a data signal identifying a single device style sheet declaration in one or more previously stored device style sheets, the single device style sheet declaration enabling manipulation of multiple types of ambiance devices, the declaration comprising: a property identifier that identifies a style property to be altered;
  a prioritized list of property values that identifies a style property value to be applied, wherein the prioritized list of property values comprises a sequence of two or more property values, wherein a first listed property value is used if supported, and wherein if the first listed property value is not supported, an attempt is made to use a next property value in the sequence until a supported property value is found; and
  a scope selector that identifies a scope of a style to be applied;
  identify at least two ambiance devices within the identified scope in electronic communication with the ambiance device controller;
  determine capabilities of the identified ambiance devices to receive and process complex control signals;
  formulate, at the ambiance device controller, a control signal for each of the identified ambiance devices based on the capabilities of the identified ambiance devices, the property identifier and property value, wherein if it is determined that a particular embedded device does not support complex control signals, translating any complex control signal for the particular embedded device into a simple control signal that the particular embedded device supports; and transmit the control signals to each of the identified ambiance devices wherein the previously stored device style sheets comprise cascading style sheets arranged hierarchically, wherein changing a feature in the device style sheet of a higher hierarchical level also changes the feature in the device style sheet that incorporated that feature.

12. The computer-readable medium of claim 11, wherein the instructions are further executable to receive the style sheet declaration from an external computing device.

13. The computer-readable medium of claim 12, wherein the external computing device is a computer game system, and wherein the style sheet declaration corresponds to events taking place within a game being played on the game system.

14. The computer-readable medium of claim 11, wherein at least one of the identified ambiance devices comprises a modifiable style sheet.

15. A system that is configured for controlling ambiance devices using a device style sheet, the system comprising:
  first ambiance device for controlling at least one aspect of an environment, the first ambiance device having a processor and memory in electronic communication with each other;
  a second and a third ambiance device within a scope for controlling at least one aspect of an environment, the second and third ambiance devices being in electronic communication with the first ambiance device;
  instructions stored in the memory of the first ambiance device, the instructions being executable to: receive at the first ambiance device a data signal identifying a single device style sheet declaration in one or more previously stored device style sheets, the single device style sheet declaration enabling manipulation of the second and third ambiance devices, wherein the second and third ambient devices comprise different types of ambient devices, the declaration comprising: a property identifier that identifies a style property to be altered; a prioritized list of property values that identifies a style property value to be applied, wherein the prioritized list of property values comprises a sequence of two or more property values, wherein a first listed property value is used if supported, and wherein if the first listed property value is not supported, an attempt is made to use a the next property value in the sequence until a supported property value is found; and a scope selector that identifies the scope of a style to be applied; determine capabilities of the second and third ambiance devices to receive and process complex control signals;

formulate, at the first ambiance device, a control signal for the second and third ambiance devices based on the capabilities of the second and third ambiance devices, the property identifier and property value, wherein if it is determined that a particular embedded device does not support complex control signals, translating any complex control signal for the particular embedded device into a simple control signal that the particular embedded device supports; and transmit the control signals to the second and third ambiance devices;

wherein the previously stored device style sheets comprise cascading style sheets arranged hierarchically, wherein changing a feature in the device style sheet of a higher hierarchical level also changes the feature in the device style sheet that incorporated that feature.

16. The method of claim 1, wherein the property values are ordered from the most desirable to the least desirable, the first listed property value being the most desirable property value.

17. The method of claim 16, wherein a user may select the sequence of the property values in the prioritized list.

* * * * *

UNITED STATES PATENT AND TRADEMARK OFFICE

CERTIFICATE OF CORRECTION

PATENT NO. : 8,078,290 B2
APPLICATION NO. : 11/301651
DATED : December 13, 2011
INVENTOR(S) : Mark Nelson It is certified that error appears in the above-identified patent and that said Letters Patent is hereby corrected as shown below:

Column 18, line 57 insert the word --a-- before the phrase “first ambiance device”.

Column 19, line 13 delete the word “the”.

Signed and Sealed this
Fifteenth Day of May, 2012

David J. Kappos
*Director of the United States Patent and Trademark Office*